(12) United States Patent
Martinez-Heath et al.

(10) Patent No.: US 11,457,102 B2
(45) Date of Patent: *Sep. 27, 2022

(54) LTE FAULT-TOLERANT SIGNALING APPROACH

(71) Applicants: AT&T Intellectual Property I, L.P., Atlanta, GA (US); AT&T Intellectual Property II, L.P., Atlanta, GA (US); AT&T Global Network Services France SAS, Courbevoie (FR)

(72) Inventors: Miguel Martinez-Heath, East Windsor, NJ (US); Keylor Eng, Seattle, WA (US); Aurelien Bruno, Colomars (FR); Scott Sayers, Jackson, NJ (US)

(73) Assignees: AT&T Intellectual Property I, L.P., Atlanta, GA (US); AT&T Intellectual Property II, L.P., Atlanta, GA (US); AT&T Global Network Services France SAS, Courbevoie (FR)

(*) Notice: Subject to any disclaimer, the term of this patent is extended or adjusted under 35 U.S.C. 154(b) by 0 days.

This patent is subject to a terminal disclaimer.

(21) Appl. No.: 17/201,806

(22) Filed: Mar. 15, 2021

(65) Prior Publication Data

US 2021/0227058 A1    Jul. 22, 2021

Related U.S. Application Data

(63) Continuation of application No. 16/012,011, filed on Jun. 19, 2018, now Pat. No. 10,986,219.

(51) Int. Cl.
*H04L 69/40* (2022.01)
*H04L 65/1016* (2022.01)
(Continued)

(52) U.S. Cl.
CPC .............. *H04L 69/40* (2013.01); *H04L 45/22* (2013.01); *H04L 65/104* (2013.01); *H04L 65/1016* (2013.01); *H04L 65/1066* (2013.01)

(58) Field of Classification Search
None
See application file for complete search history.

(56) References Cited

U.S. PATENT DOCUMENTS

| | | |
|---|---|---|
| 9,037,145 B2 | 5/2015 | Mao et al. |
| 9,294,337 B2 | 3/2016 | Bollapalli et al. |

(Continued)

FOREIGN PATENT DOCUMENTS

| | | |
|---|---|---|
| CN | 106685737 A | 5/2017 |
| JP | 6088632 A | 6/2017 |

(Continued)

OTHER PUBLICATIONS

Beyersdorf, et al., "Virtualization of VoIP Application Servers for Implementation of Private Unified Communication Services via LTE," 18. VDE/ITG Fachtagung Mobilkommunikation May 15-16, 2013—Osnabrock, Germany, 6 pages.

(Continued)

*Primary Examiner* — June Sison
(74) *Attorney, Agent, or Firm* — Amin, Turocy & Watson, LLP

(57) ABSTRACT

Fault-tolerant signaling in a Long Term Evolution (LTE) network architecture is disclosed. A method can comprise initiating a primary signaling path to a signaling server device; in response to the initiating, establishing an alternate signaling path to a web application server device, wherein a call session is established over the primary signaling path; monitoring the primary signaling path for a session failure;

(Continued)

and in response to the session failure, switching the call session from using the primary signaling path to using the alternate signaling path.

20 Claims, 13 Drawing Sheets

(51) Int. Cl.
*H04L 45/00* (2022.01)
*H04L 65/1066* (2022.01)
*H04L 65/1033* (2022.01)

(56) References Cited

U.S. PATENT DOCUMENTS

| | | | |
|---|---|---|---|
| 9,386,623 B2 | 7/2016 | Mao et al. | |
| 9,467,480 B2 | 10/2016 | Mandyam et al. | |
| 9,756,452 B2 | 9/2017 | Mandyam et al. | |
| 2011/0149951 A1 | 6/2011 | Qiu et al. | |
| 2013/0272109 A1 | 10/2013 | Qiu et al. | |
| 2014/0325078 A1 | 10/2014 | Shan et al. | |
| 2014/0348044 A1 | 11/2014 | Narayanan et al. | |
| 2015/0207847 A1 | 7/2015 | Kim et al. | |
| 2015/0373056 A1 | 12/2015 | Bouthemy | |
| 2015/0382384 A1 | 12/2015 | Baek et al. | |
| 2016/0105468 A1 | 4/2016 | Mufti et al. | |
| 2016/0142467 A1 | 5/2016 | Ban et al. | |
| 2016/0330252 A1 | 11/2016 | Stahl et al. | |
| 2016/0337410 A1 | 11/2016 | Hancock et al. | |
| 2017/0063941 A1 | 3/2017 | Tregenza | |
| 2017/0104714 A1 | 4/2017 | Naidu et al. | |
| 2017/0141934 A1 | 5/2017 | Ding et al. | |
| 2017/0244767 A1* | 8/2017 | Jana | H04L 12/1863 |
| 2017/0347304 A1 | 11/2017 | Kodaypak et al. | |
| 2017/0374538 A1 | 12/2017 | Gellens et al. | |
| 2018/0255110 A1* | 9/2018 | Dowlatkhah | H04L 65/1016 |
| 2018/0295057 A1* | 10/2018 | Cui | H04L 41/5051 |
| 2019/0141772 A1* | 5/2019 | Chiang | H04L 65/80 |
| 2019/0342347 A1* | 11/2019 | Agarwal | H04W 4/16 |

FOREIGN PATENT DOCUMENTS

| | | | |
|---|---|---|---|
| WO | 2015/050547 A1 | 4/2015 | |
| WO | 2015/104425 A1 | 7/2015 | |

OTHER PUBLICATIONS

Edwaldsson, "On the brink of the Networked Society," The Ericsson Review, Jan. 2012, 40 pages.
Lemberg, "Integrating Web-Based Multimedia Technologies with Operator Multimedia Services Core," 2017, 72 pages.
Simo, "Inter-domain Interoperability Framework based on WebRTC," Apr. 2015, 131 pages.
Tuffin, et al., "WebRTC and IMS: Parallel Universes on a Collision Course?," 19th International ICIN Conference-innovations in Clouds, Internet and Networks—Mar. 1-3, 2016, 7 pages.
Non Final office action received for U.S. Appl. No. 16/012,011 dated Mar. 30, 2020, 29 pages.
Final office action received for U.S. Appl. No. 16/012,011 dated Jul. 27, 2020, 29 pages.

* cited by examiner

US 11,457,102 B2

LTE FAULT-TOLERANT SIGNALING APPROACH

RELATED APPLICATION

The subject patent application is a continuation of, and claims priority to, U.S. patent application Ser. No. 16/012,011, filed Jun. 19, 2018, and entitled "LTE F AULT-TOLERANT SIGNALING APPROACH," the entirety of which application is hereby incorporated by reference herein.

STATEMENT CONCERNING GOVERNMENT INTEREST

This invention was made with government support under HC1013-14-C-0003 awarded by Department of Homeland Security, Office of Emergency Communications. The government may have certain rights in the invention.

TECHNICAL FIELD

The disclosed subject matter relates to providing fault-tolerant signaling in a LTE network architecture.

BACKGROUND

Voice over Long Term Evolution (VoLTE) is a standard for high-speed wireless communication for mobile phones and data terminals. It is based on the Internet Protocol Multimedia Subsystem (IMS) network with specific profiles for control and media planes of voice service on Long Term Evolution (LTE). This approach results in the voice service being delivered as data flows within a LTE data bearer. This means there generally is no dependency on the legacy circuit switched voice network.

Web Real-Time Communication (WebRTC) provides web browser and mobile applications with real-time communication (RTC) via application programming interfaces (APIs). It allows audio and video communication to work inside web pages by allowing direct peer to peer communication.

DETAILED DESCRIPTION

Figure 1:
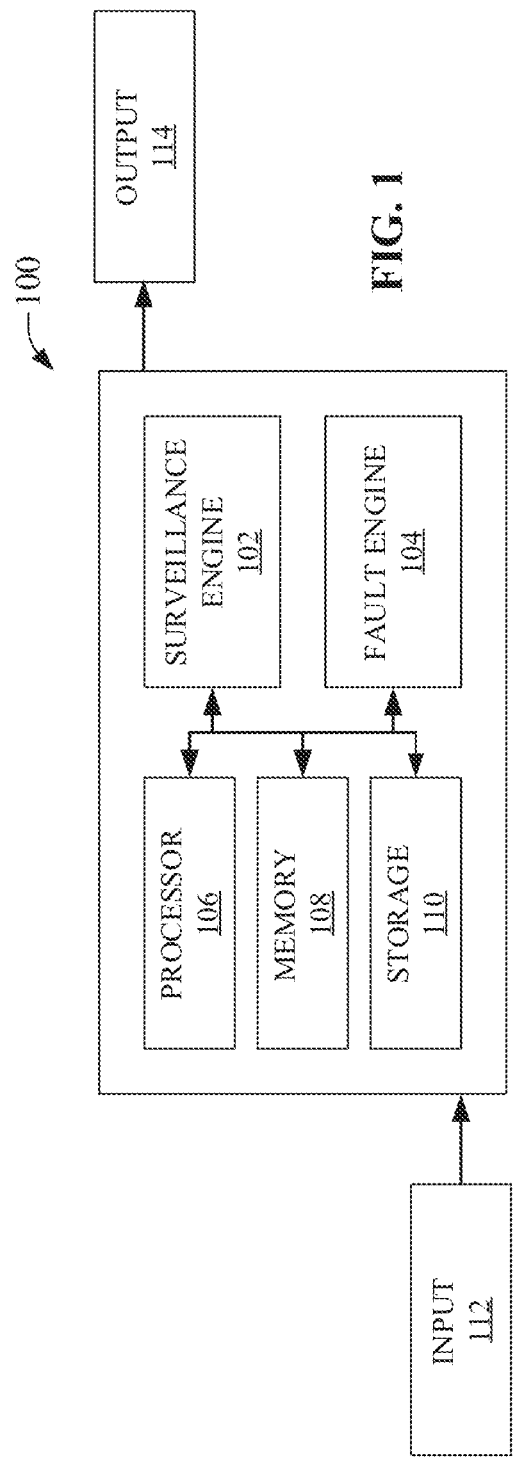
FIG. 1 is an illustration of a system for providing fault-tolerant signaling in a LTE network architecture, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The subject application leverages WebRTC technology to provide an additional and/or alternative signaling path beyond the infrastructure provided by the current LTE based IMS network architecture. Disclosed embodiments can be used, for example, by key government officials during national emergencies to provide a robust signaling architecture for LTE user equipment devices by engineering a recovery path signaling path for VoLTE and conversational video end user devices. The disclosure provides that a device, in response to detecting a call setup failure (e.g., a failure in the underlying IMS architecture), can initiate and maintain communications between calling and receiving parties (e.g., calling and receiving end user devices) by using alternative/backup non-IMS signaling infrastructures and alternative/backup data paths. The goal that the subject disclosure seeks to achieve is to provide end user devices with ultra-reliable voice and video sessions.

While the subject application was initially designed to provide a backup/alternative signaling to IMS during severe network stress conditions, the disclosure can find general utility and applicability by typically all LTE enabled devices at any time.

As described, the subject application discloses a first device (e.g., a first user equipment (UE) device) that initiates a communication session (e.g., a media flow representing at least voice data, audio data, video data, and/or general data (overhead data, text data, . . . ) with a second device (e.g., a second user equipment (UE) device). For ease of exposition the first device can be referred to as the calling device (or calling party) and the second device can be referred to as the receiving device (or receiving party). In order to initiate and/or establish the communication session (e.g., a voice over long term evolution (VoLTE) communication session) between the calling device and the receiving device, the calling device can establish/initiate a communication session with a signaling server device (e.g., a base station device such as an evolved NodeB (eNodeB) device) using one or more establishment protocols. As will be appreciated by those with ordinary skill, without limitation or loss of generality, the signaling server device can be a member of a grouping of similarly configured signaling server devices; the grouping of signaling server devices and/or other groupings of affiliated devices can comprise a network topology.

The signaling server device, in response to recognizing that the calling device seeks to initiate and establish communication with the receiving device can facilitate communication with the receiving device using an appropriate establishment protocol(s). Once a communication session has been established, the calling device and the receiving device can thereafter communicate via a "signaling path" established through the functionalities and facilities provided by the signaling server device. The signaling part can also be referred to as an IMS signaling path.

The foregoing signaling path (e.g., primary signaling path), in times of network stress and the like, can be subject to failure. For example, problems with initiating and/or establishing the signaling path between the first and second devices can arise when a calling party initially attempts to establish a communication session with the signaling server device, for example where contact with the signaling server device from the first device becomes inoperable because of a network failure. Further problems can arise when the signaling server device attempts to establish a communication session with the receiving device, once again because of a failure due to a wider network failure. Additional problems can also manifest themselves once the signaling path has been established between the calling party and receiving party (e.g. in mid communication session between the calling party and the receiving party).

In order to alleviate, mitigate, and/or obviate the aforementioned possible signaling path failures, the subject application discloses that when the first device attempts to initiate a signaling path with the second device, simultaneously and/or in near contemporaneity with and in response to the first device initiating the communication session with the second device (e.g., via the facilities and functionalities of the signaling server device), a web application server device, using functionalities and facilities associated with WebRTC, can also be contacted by the first device. The web application server device through use of the functionalities and functionalities provided by WebRTC in conjunction with a controlling wrapper application can establish a secondary signaling path between the first device and the second device. The secondary signaling path can become fully operable in response to a determination that there is a failure with regard to the primary signaling path. The secondary signaling path can become fully operational without users of either the first device or the second device becoming aware of the switch over between the primary signaling path and the secondary signaling path; or if indication of the switch over between the primary signaling path and the secondary signaling path deemed necessary, such indication can, for example, be provided by an imperceptible "click" sound. The secondary signaling path can also be referred to as a non-IMS signaling path or as an alternative signaling path.

The disclosed systems and methods, in accordance with various embodiments, provide a system, apparatus, or device comprising: a processor, and a memory that stores executable instructions that, when executed by the processor, facilitate performance of operations. The operations can comprise detecting initiation of a primary signaling path to a signaling server device; initiating an alternate signaling path to a web application server device based on the detecting, wherein a call session is established over the primary signaling path; monitoring the primary signaling path for a session failure; and as a function of the session failure, switching the call session from using the primary signaling path to using the alternate signaling path.

Additional operations can comprise collecting calling information data representative of the primary signaling path, establishing the alternate signaling path using the calling information data, and as a function of the monitoring, initiating a failure timer. Further operations can include based on the initiating the alternate signaling path, further initiating a call establishment service request to the web application server device, and in response to the call session being established via the primary signaling path, facilitating canceling of the call establishment service request.

In accordance with the foregoing, the system, apparatus, or device can be a first device, and the signaling server device can be a second device of a group of network devices that operate using internet protocol multimedia core network subsystem signaling. Additionally, and/or alternatively, the web application server device can be a second device of a group of network devices that operate using alternate signaling other than internet protocol multimedia core network subsystem signaling.

In accordance with additional and/or alternative embodiments, the disclosure further describes a system, apparatus, or device comprising: a processor, and a memory that stores executable instructions that, when executed by the processor, facilitate performance of operations. The operations can comprise detecting initiation of a primary signaling path to a signaling server device, wherein a call session is established via the primary signaling path; based on the detecting, initiating an alternate signaling path, as an alternative to the primary signaling path, to a web application server device; monitoring the primary signaling path for a session failure of the call session; and as a function of the session failure, switching the call session from using the primary signaling path to using the alternate signaling path.

Additional operations can comprise collecting, from a user device initiating the call session, calling information data representative of the primary signaling path; initiating the alternate signaling path using the calling information data; and as a function of the monitoring, initiating a failure timer that is used to determine, as a function of an elapse of time as measured by the failure timer, that the session failure has occurred. Further operations can comprise based on the alternate signaling path having been initiated, further initiating a call establishment service request to the web application server device; and in response to the call session being determined to have been established via the primary signaling path, facilitating canceling of the call establishment service request.

In accordance with the foregoing, the system, apparatus, or device can a first device, and the signaling server device can be a second device of a group of network devices that operate using internet protocol multimedia core network subsystem signaling; and the web application server device can be a second device of a group of network devices that operate using alternate signaling other than internet protocol multimedia core network subsystem signaling.

In accordance with further embodiments, the subject disclosure describes a method, comprising a series of acts that can include: initiating, by a device comprising a processor, a primary signaling path to a signaling server device; in response to the initiating, establishing, by the device, an alternate signaling path to a web application server device, wherein a call session is established over the primary signaling path; monitoring, by the device, the primary signaling path for a session failure; and in response to the session failure, switching, by the device, the call session from using the primary signaling path to using the alternate signaling path.

Further acts can comprise: in response to initiating the primary signaling path, collecting, by the device, calling information data representative of the primary signaling path; establishing, by the device, the alternate signaling path using the calling information data; and initiating, by the device, a countdown timer in response to establishing the alternate signaling path; Additional acts can include: in response to initiating the alternate signaling path, further initiating, by the device, a call establishment service request to the web application server device; and in response to detecting a success in establishing the call session, facilitating, by the device, canceling the call establishment service request.

In accordance with the foregoing, the signaling server device can be a first device of a network of devices that provide a voice over long term evolution core network service, and the web application server device can be a second device of the network of devices that provide a voice over internet protocol network service.

In accordance with additional embodiments, the subject disclosure describes a method, comprising a series of acts that can include: initiating, by a device comprising a processor, a primary signaling path to a signaling server device; in response to the initiating, establishing, by the device, an alternate signaling path to a web application server device, wherein a call session is established using the primary signaling path, and wherein the alternate signaling path is an alternative path to the primary signaling path; monitoring, by the device, the primary signaling path for a failure of the call session; and in response to the failure of the call session, switching, by the device, the call session from using the primary signaling path to using the alternate signaling path.

Further acts performed by the method can comprise: in response to initiating the primary signaling path, collecting, by the device, calling information data representative of the primary signaling path, wherein the calling information data is received from a user device; establishing the alternate signaling path using the calling information data; and initiating, by the device, a countdown timer in response to the establishing of the alternate signaling path. Additional acts can comprise: in response to the establishing of the alternate signaling path, initiating, by the device, a call establishment service request to the web application server device; and in response to detecting a success in establishing the call session, facilitating, by the device, canceling the call establishment service request.

In accordance with the foregoing, the signaling server device can be a first device of a network of devices that provide a voice over long term evolution core network service; and the web application server device can be a second device of the network of devices that provide a voice over internet protocol network service.

In accordance with still further embodiments, the subject disclosure describes a machine readable storage medium, a computer readable storage device, or non-transitory machine readable media comprising instructions that, in response to execution, cause a computing system comprising at least one processor to perform operations. The operations can include: establishing a primary signaling path to a signaling server device; in response to the establishing, initiating creation of an alternate signaling path to a web application server device, wherein a call session is established over the primary signaling path; monitoring the primary signaling path for a session failure; and in response to the session failure, switching the call session from using the primary signaling path to using the alternate signaling path. Additional operations can include initiating, to the web application server device, a call establishment need service request, and in response to detecting success in establishing the call session, facilitating cancelation of the call establishment need service request.

In accordance with the foregoing, the signaling server device enables a voice over long term evolution core network service, and the web application server device enables a voice over internet protocol network service.

In accordance with yet further embodiments, the subject disclosure describes a machine readable storage medium, a computer readable storage device, or non-tangible machine readable media comprising instructions that, in response to execution, cause a computing device comprising at least one processor to perform operations. The operations can comprise: establishing a primary signaling path to a signaling server device; in response to the establishing, initiating creation of an alternate signaling path to a web application server device, wherein a call session is established via the primary signaling path; monitoring the primary signaling path for failure of the call session; and in response to the failure, switching the call session from using the primary signaling path to using the alternate signaling path. Additional operations can comprise initiating, to the web application server device, a call establishment need service request, and in response to detecting success in establishing the call session, facilitating cancelation of the call establishment need service request.

Now with reference to the Figures, FIG. 1 illustrates a system 100 that in accordance with various embodiments provides for fault-tolerant signaling in a LTE network architecture. System 100 can include a surveillance engine 102 and fault engine 104 that can each be coupled to a processor 106, memory 108, and storage 110. Each of surveillance engine 102 and fault engine 104 can be in communication with processor 106 for facilitating operation of computer or machine executable instructions and/or components by each of surveillance engine 102 and fault engine 104, memory 108, for storing data and/or the computer or machine executable instructions and/or components, and storage 110 for providing longer term storage of data and/or machine and/or computer readable instructions. Additionally, system 100 can also receive input 112 for use, manipulation, and/or transformation by each of surveillance engine 102 and fault engine 104 to produce one or more useful, concrete, and tangible result, and/or transform one or more articles to different states or things. Further, system 100 can also generate and output the useful, concrete, and tangible results and/or the transformed one or more articles produced by each of surveillance engine 102 and fault engine 104 and output as output 114.

System 100, for purposes of elucidation, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

System 100 (e.g., surveillance engine 102 and/or fault engine 104) can receive (as input 112) data representative of an initiation request to initiate and establish a communication session (e.g., a primary signaling path) between a first device and a second device. The initiation request can comprise data representative of information associated with calling party information (e.g., unique originating identifier (calling party's telephone number), quality of service (QoS) data, and the like) and receiving party information (e.g., unique destination identifier (receiving party's telephone number), etc.). The data representative of information associated with calling party information and receiving party information can be used, for instance, by a signaling service device to establish a communications session (e.g., IMS signaling path) between the calling party in the receiving party.

In response to receiving the data representative of information associated with calling party information and receiving party information, system 100 can determine whether IMS network infrastructure is operational, for example, system 100 can establish whether or not there are hard failures associated with the wider IMS network architecture. Further, system 100 can also trigger high level interrupts and/or watchdog timers (or generic timers configured to be: watchdog timers; countdown timers—timers that count down (decrease) from a first value to a second value; count-up timers—timers that count up (increase) from a first value to a second value; and the like). System 100, as a function of, in response to, or based on, high level interrupts being triggered and/or input from the watchdog timers can further ascertain whether an IMS signaling path between the first device and the second device has been established via a device of groups of devices that can comprise the wider IMS network architecture. For example, where time, as determined by a watchdog timer, has reached a threshold value and the signaling path between the first device and the second device has not been established, system 100 can determine that there has been a failure with the underlying IMS network infrastructure. Where system 100 determines that a signaling path has been established between the first device and the second device, system 100 can determine that a communication session between the first device and the second device is in session.

Simultaneously, or in near contemporaneity, with receiving data representative of an initiation request to initiate and establish the communication session (e.g., the primary signaling path) between a first device and a second device, system 100 (e.g., surveillance engine 102 and/or fault engine 104) can also initiate processes needed to establish a secondary signaling path (a non-IMS signaling path) from the first device to the second device. It should be appreciated that the secondary signaling path is generally, without limitation or loss of generality and for the purposes of this disclosure, only used when there are problems with initiating, establishing, and/or maintaining the primary signaling path (e.g., the IMS signaling path) between the first device and the second device. System 100 in order to initiate and establish the secondary signaling path from the first device to the second device can collect the calling information included in the initiation request (e.g., calling party information—unique originating identifier (calling party's telephone number) quality of service (QoS) data, security data and the like; and receiving party information—unique destination identifier (receiving party's telephone number), etc.) and initiate a wrapper application process that together with aspects included with WebRTC can contact the web application server device. As has been noted above, the secondary signaling path is a non-IMS signaling path that becomes operational in response to a determination that there has been a failure with regard to the primary IMS signaling path.

System 100 in response to the determination that there has been a failure with regard to the primary IMS signaling path between the first device and the second device, can initiate the secondary signaling path between the first device and the second device. Additionally, system 100 can determine whether a request to establish the secondary signaling path has been successful, and thereafter system 100 can apply the call attributes that can have been extant in regard to the primary IMS signaling path between the first device and the second device (e.g., QoS data, Codex data, security data, etc.)

Figure 2:
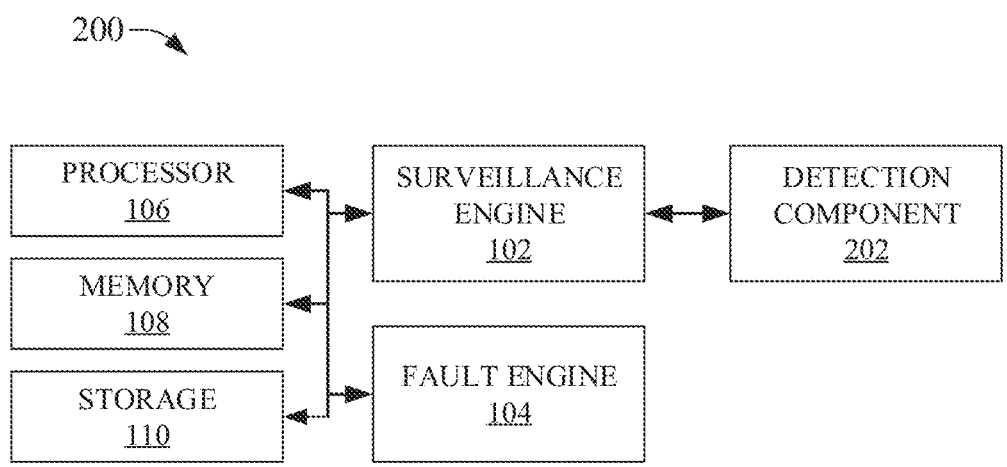
FIG. 2 is a further depiction of a further system for providing fault-tolerant signaling in a LTE network architecture, in accordance with aspects of the subject disclosure.

FIG. 2 illustrates system 100, now represented as system 200, that in accordance with various embodiments provides for fault-tolerant signaling in a LTE network architecture. In this depiction, system 200 can comprise surveillance engine 102 and fault engine 104 that can be communicatively coupled to processor 106, memory 108, and storage 110. Additionally, communicatively coupled to surveillance engine 102 can be detection component 202. Surveillance engine 102 in conjunction with detection component 202 can detect when a voice over long term evolution (VoLTE) session or a conventional video call session is being initiated, for example, by a first device attempting to establish a VoLTE session and/or a conventional video call session with a second device.

In regard to first device and second device, these devices can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise first device and/or second device can include, tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, devices associated with satellite technologies, devices included in stationary vehicles and/or vehicles in motion, devices associated with aeronautical vehicles, robotic devices, and the like.

Figure 3:
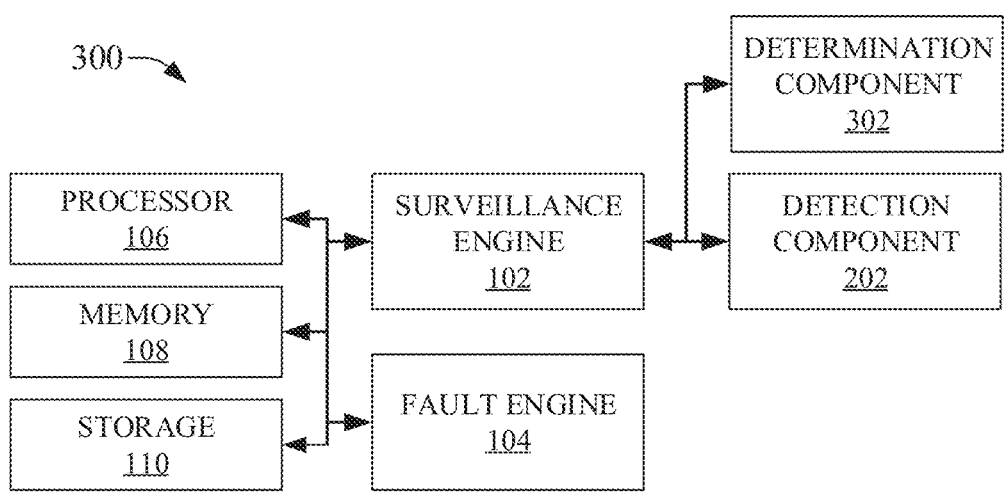
FIG. 3 provides illustration of an additional system for providing fault-tolerant signaling in a LTE network architecture, in accordance with aspects of the subject disclosure.

FIG. 3 provides additional illustration of system 100, now represented as system 300, that in accordance with various embodiments provides for fault-tolerant signaling in a LTE network architecture. As illustrated, system 300 can comprise detection component 202 operatively coupled to surveillance engine 102, fault engine 104, processor 106, memory 108, and storage 110. Further, as illustrated system 300 can comprise determination component 302 that, in conjunction with detection component 202 and surveillance engine 102, and as a function of detection component 202 having detected that a first device is attempting to establish a VoLTE session and/or a conventional video call session with a second device, can determine whether the IMS network infrastructure is operational. For instance, determination component 302 can establish whether or not there are hard failures associated with the wider IMS network architecture.

Figure 4:
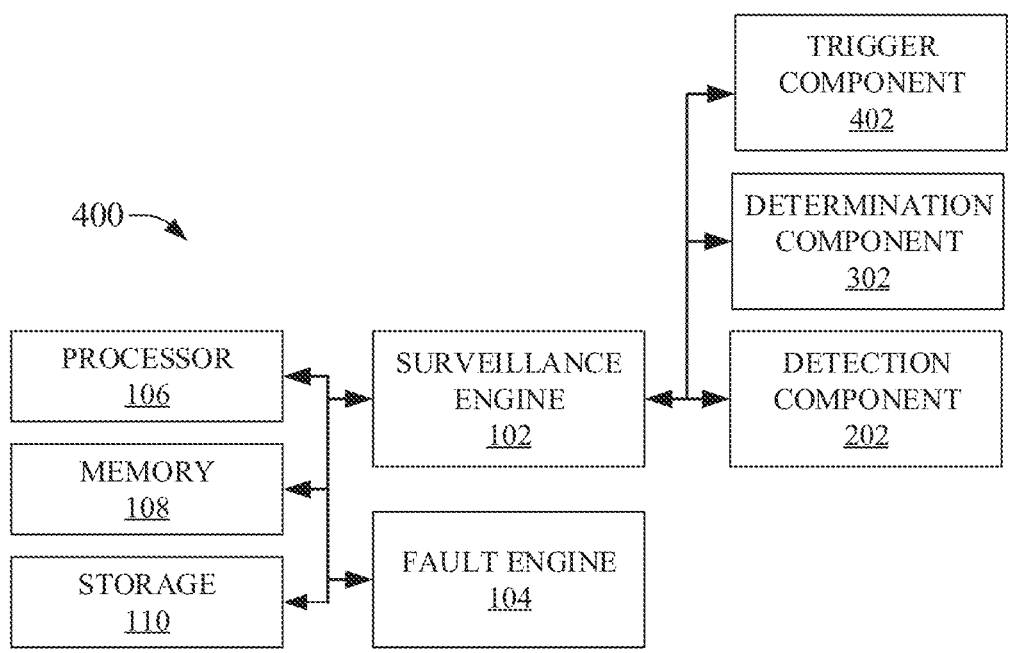
FIG. 4 provides another illustration of a system for providing fault-tolerant signaling in a LTE network architecture, in accordance with aspects of the subject disclosure.

FIG. 4 provides additional depiction of system 100, now represented as system 400, that in accordance with various embodiments provides for fault-tolerant signaling in a LTE network architecture. In this instance, system 400 can comprise trigger component 402 that can operate in collaboration with determination component 302, detection component 202, and surveillance engine 102 to trigger high level interrupts and/or watchdog timers. The watchdog timers associated with trigger component 402 can be generic timers that can be configured to be watchdog timers; countdown timers—timers that count down (decrease) from a first threshold value to a second threshold value; count up timers—timers that count up (increase) from a first threshold value to a second threshold value; and the like.

Figure 5:
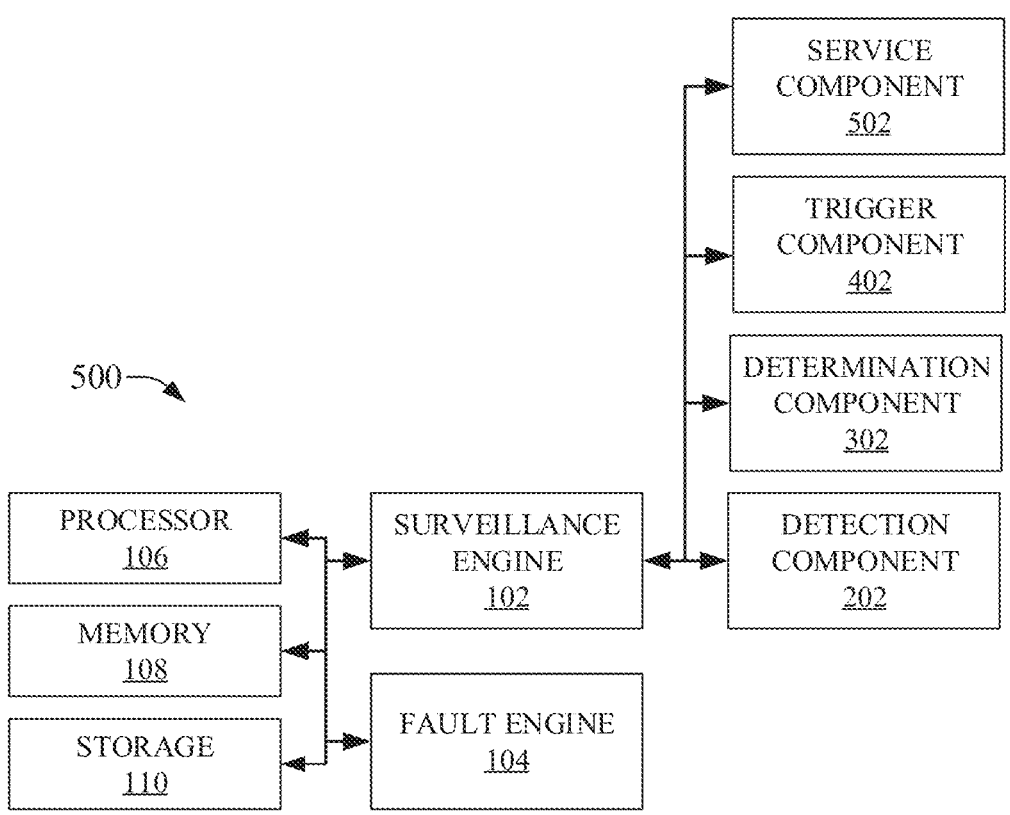
FIG. 5 illustrates another depiction of a system for providing fault-tolerant signaling in a LTE network architecture, in accordance with aspects of the subject disclosure.

FIG. 5 provides further depiction of system 100, now represented as system 500, that in accordance with various embodiments provides for fault-tolerant signaling in a LTE network architecture. System 500 illustrates a service component 502 that in conjunction with trigger component 402, determination component 302, detection component 202, and surveillance engine 102, and in response to, based on, and/or as a function of high level interrupts being triggered and/or input from the watchdog timers, can further determine whether an IMS signaling path between the first device and the second device has been established via the functionalities and functionalities associated with the wider IMS networking architecture(s) provided by one or more mobile networking operator (MNO). For instance, where time, as determined by a watchdog timer, has reached a threshold value in the signaling path from the first device to the second device has not been established, trigger component 402 in concert with service component 502 can determine that there has been a failure with the underlying IMS network infrastructure. Where trigger component 402 and service component 502 determine that there has been a failure to establish an IMS signaling path between the first device and the second device, and in response to the aforementioned determination (e.g., failure to establish an IMS signaling path between the first and the second devices), service component 502 can also cancel a service request that can have been initiated initially in order to establish the IMS signaling path between the first device and the second device, and, as will be discussed subsequently in connection with fault engine 104 and initiation component 802, service component 502 can commence establishing a secondary/alternate signaling path (a non-IMS signaling path) between the first device and the second device.

Figure 6:
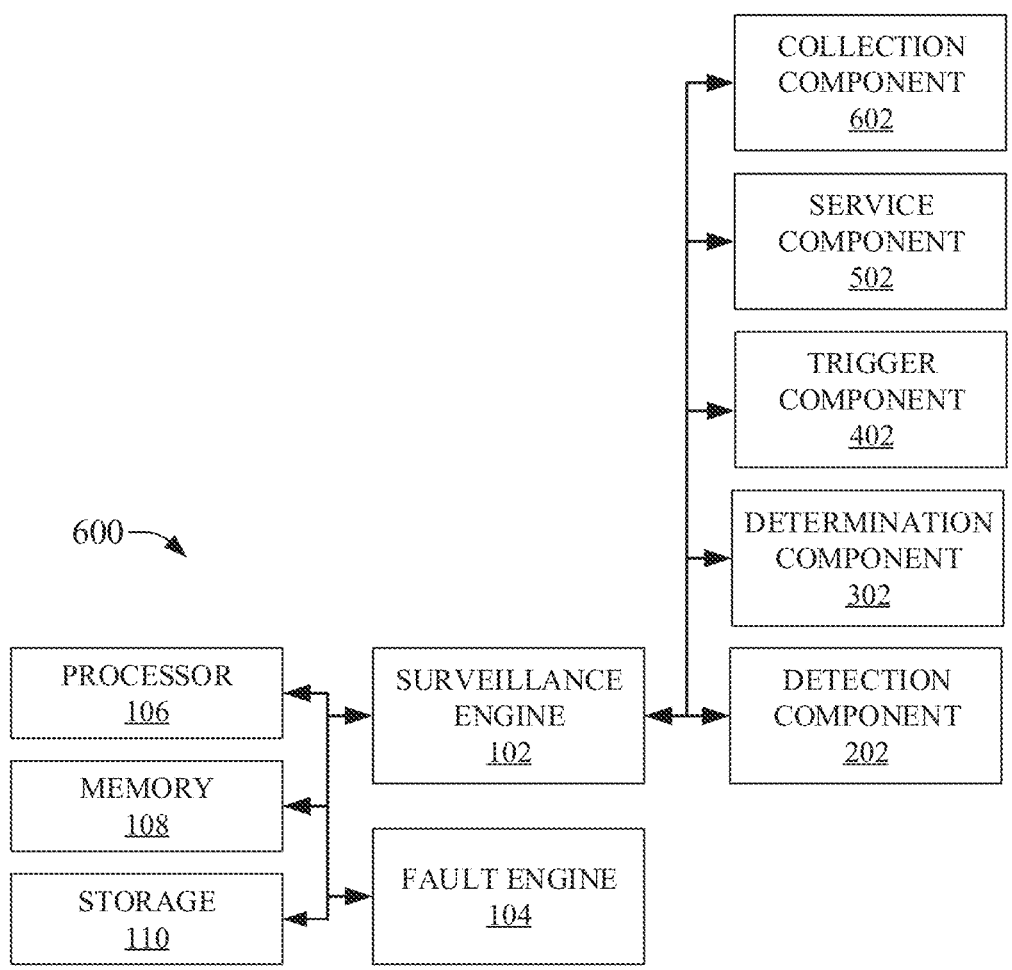
FIG. 6 depicts a further system for providing fault-tolerant signaling in a LTE network architecture, in accordance with aspects of the subject disclosure FIG. 7 provides illustration of an additional system for providing fault-tolerant signaling in a LTE network architecture, in accordance with aspects of the subject disclosure

FIG. 6 provides yet further illustration of system 100, now represented as system 600, that in accordance with various embodiments provides for fault-tolerant signaling in a LTE network architecture. In regard to system 600, system 600 can comprise collection component 602 that can operate in concert with service component 502, trigger component 402, determination component 302, detection component 202, and surveillance engine 102 can collect the calling information included with the initiation request from the first device (e.g., calling party information—unique originating identifier (e.g., subscriber number associated with the first device), quality of service (QoS) data associated with the first device, security data (e.g., public cryptographic key(s)) associated with the first device, and receiving party information—unique destination identifier (e.g., subscriber number associated with the second device), QoS data associated with the second device, security data associated with the second device, and the like. The calling information included with the initiation request from the first device attempting to establish a signaling path to the second device, it should be noted, will generally be the same information that will be used to establish the non-IMS signaling path.

Figure 7:
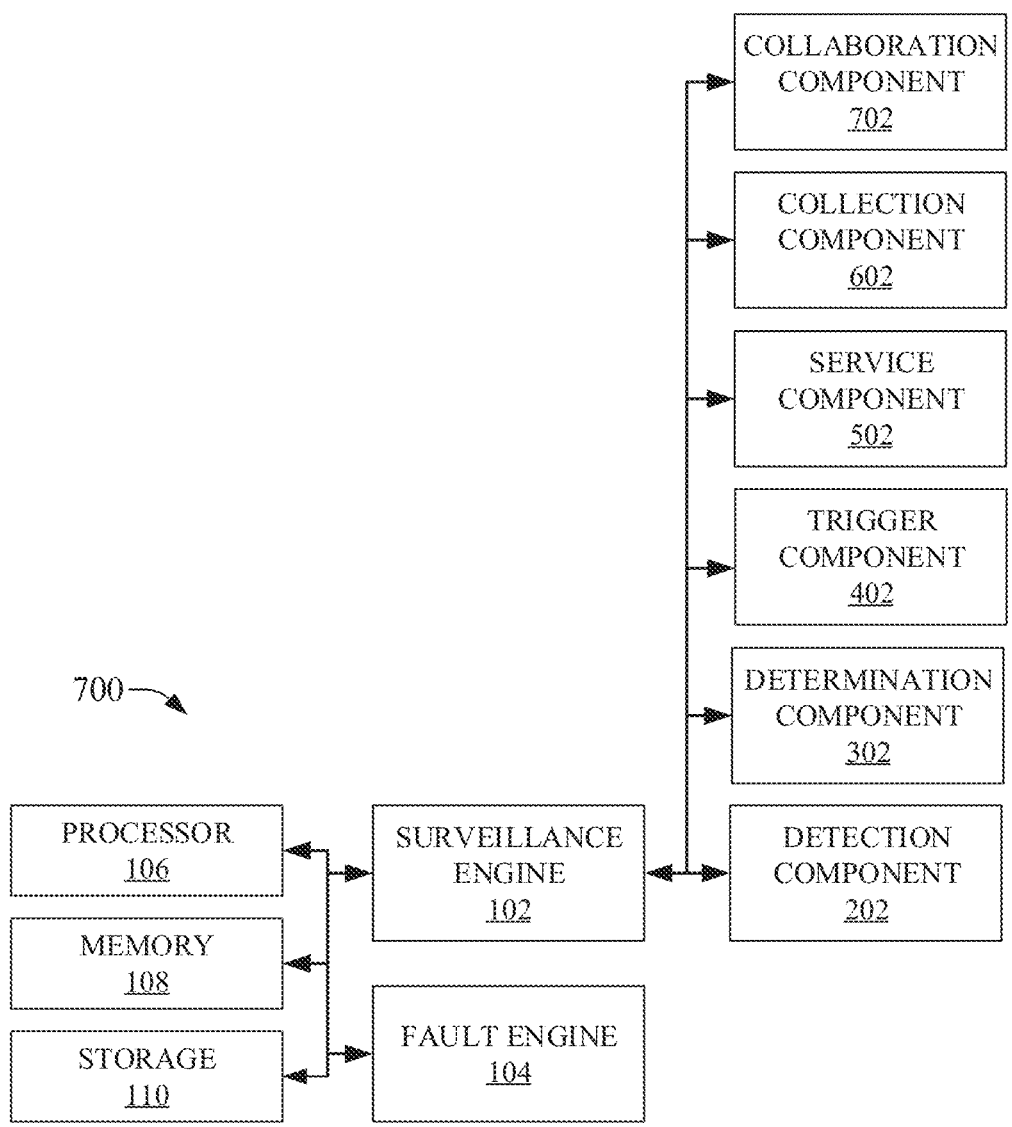

FIG. 7 provides still further depiction of system 100, now represented as system 700, that in accordance with various embodiments provides for fault-tolerant signaling in a LTE network architecture. System 700 as depicted can comprise collaboration component 702 that in conjunction with the functionalities and facilities provided by collection component 602, service component 502, trigger component 402, determination component 302, detection component 202, and surveillance engine 102 can initiate a wrapper application process that together with aspects included with the WebRTC can contact a web application server device in order to establish a secondary/alternate signaling path between the first device and the second device. As will be appreciated by those having ordinary skill in the art, the Web application server device can establish the secondary/alternate signaling path based on information supplied by collection component 602. The secondary/alternate signaling path, as will also be appreciated by those having skill in the art, will be a non-IMS signaling path between the first device and the second device, thereby circumventing any issues that might be preventing the establishment of a IMS signaling path. The non-IMS signaling path can be distinct and separate, and thereby provide a redundancy, to the IMS signaling path. The non-IMS signaling path therefore provides for fault-tolerance signaling in a LTE network architecture environment.

Figure 8:
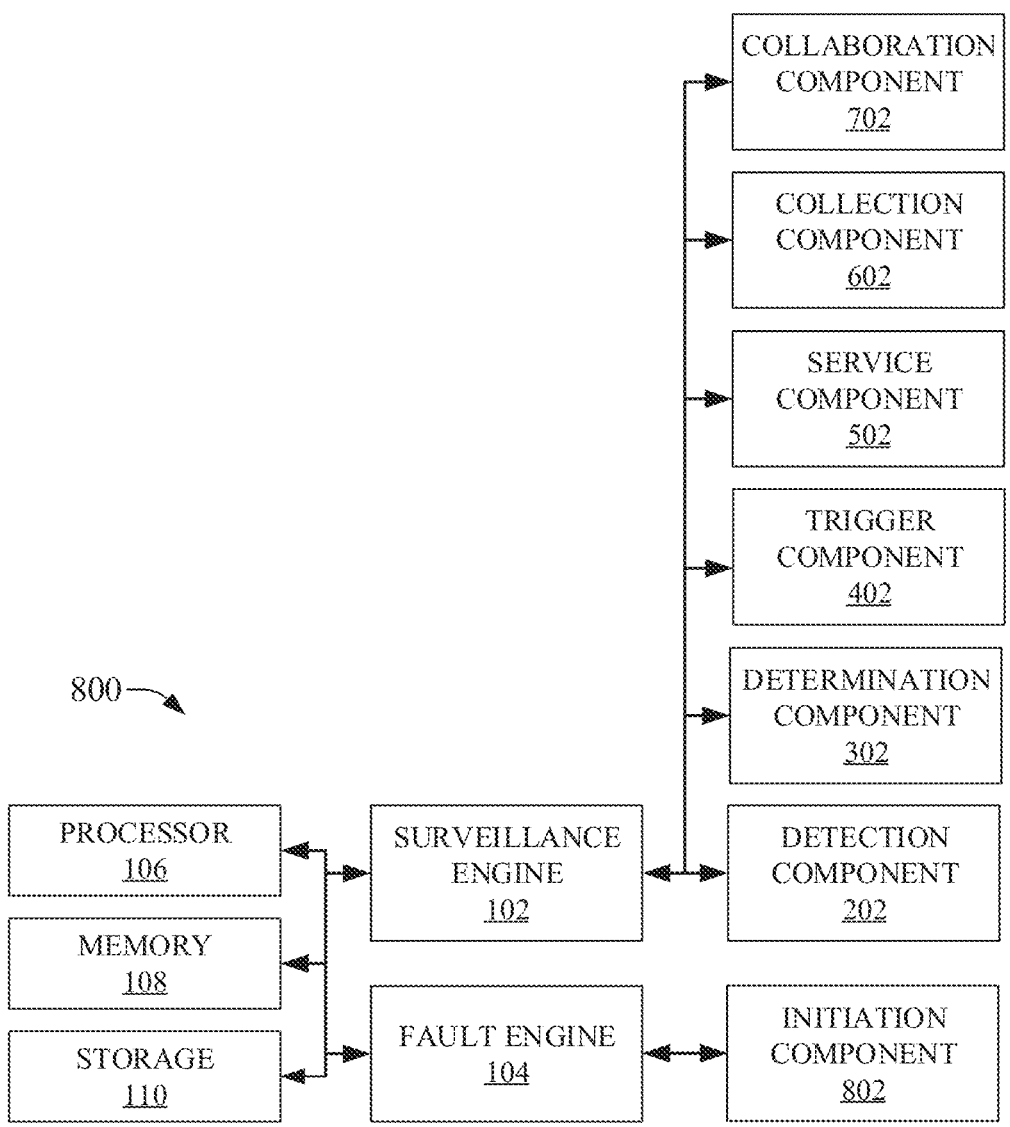
FIG. 8 illustrates another system for providing fault-tolerant signaling in a LTE network architecture, in accordance with aspects of the subject disclosure

FIG. 8 provides further illustration of system 100, now represented as system 800, that in accordance with various embodiments provides for fault-tolerant signaling in a LTE network architecture. System 800 can comprise surveillance engine 102 and fault engine 104 that can be communicatively coupled to processor 106, memory 108, and storage 110. Additionally, system 800 also can comprise collaboration component 702, collection component 602, service component 502, trigger component 402, determination component 302, and detection component 202 that can be communicatively coupled to surveillance engine 102. Communicatively coupled to fault engine 104 can be initiation component 802. Fault engine 104 in collaboration with initiation component 802, in response to detection component 202 having received data representative of an initiation request to initiate and establish a communication session (e.g. a primary signaling path) between a first device and a second device, can initiate, simultaneously or in near contemporaneity, processes and/or procedures needed to initiate (though not necessarily establish) and maintain in a state of hibernation or stasis, a secondary signaling path from the first device to the second device. As has been noted above, the secondary signaling path (e.g., the non-IMS signaling path) is typically, without limitation or loss of generality, only used when there are problems with instantiating and/or maintaining a primary signaling path (e.g., the IMS signaling path) between the first device and the second device. Thus, if and when a failure to establish or maintain a primary signaling path between the first device and the second device is detected by service component 502, for example, an indication by service component 502 can be sent to initiation component 802, at which time and in response to the indication directed by service component 502 initiation component 802 can bring the initiated secondary signaling path out of the state of hibernation or stasis and establish the secondary signaling path from the first device to the second device.

Figure 9:
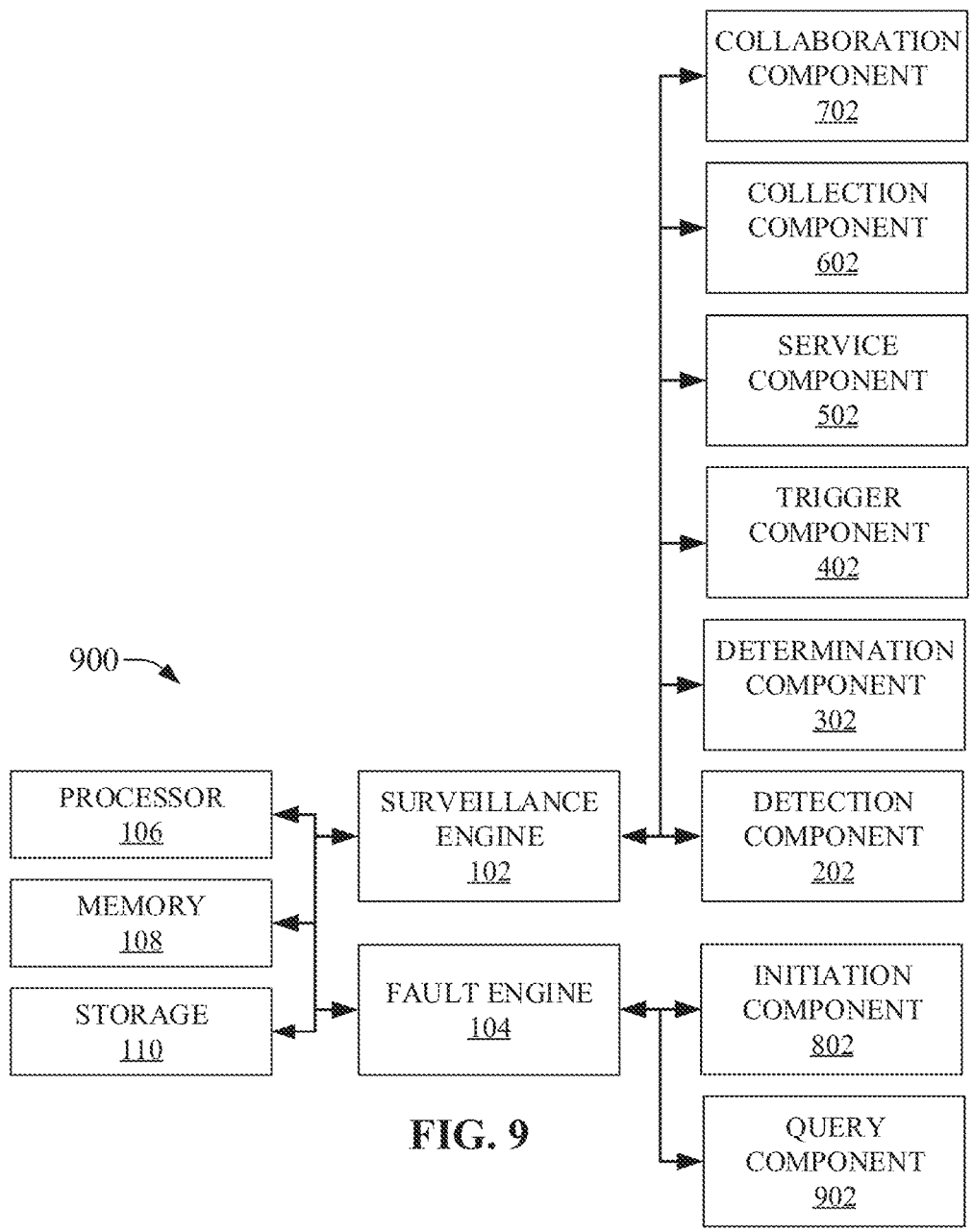
FIG. 9 depicts a further system for providing fault-tolerant signaling in a LTE network architecture, in accordance with aspects of the subject disclosure

FIG. 9 provides further depiction of system 100, now represented as system 900, that in accordance with various embodiments provides for fault-tolerant signaling in a LTE network architecture. System 900 can comprise fault engine 104 communicatively and operatively coupled to initiation component 802 and query component 902, wherein fault engine 104, initiation component 802, and query component 902 in collaboration can determine whether the secondary signaling path between the first device and the second device has been established successfully. In instances where the secondary signaling path has not been, or cannot be, successfully established between the first device and the second device, this circumstance can be due to a generalized networking failure associated with the non-IMS networking infrastructure, and as such a signaling path (e.g., IMS-signaling path and non-IMS signaling path) is unavailable and not communication can be established between the first device and the second device.

Figure 10:
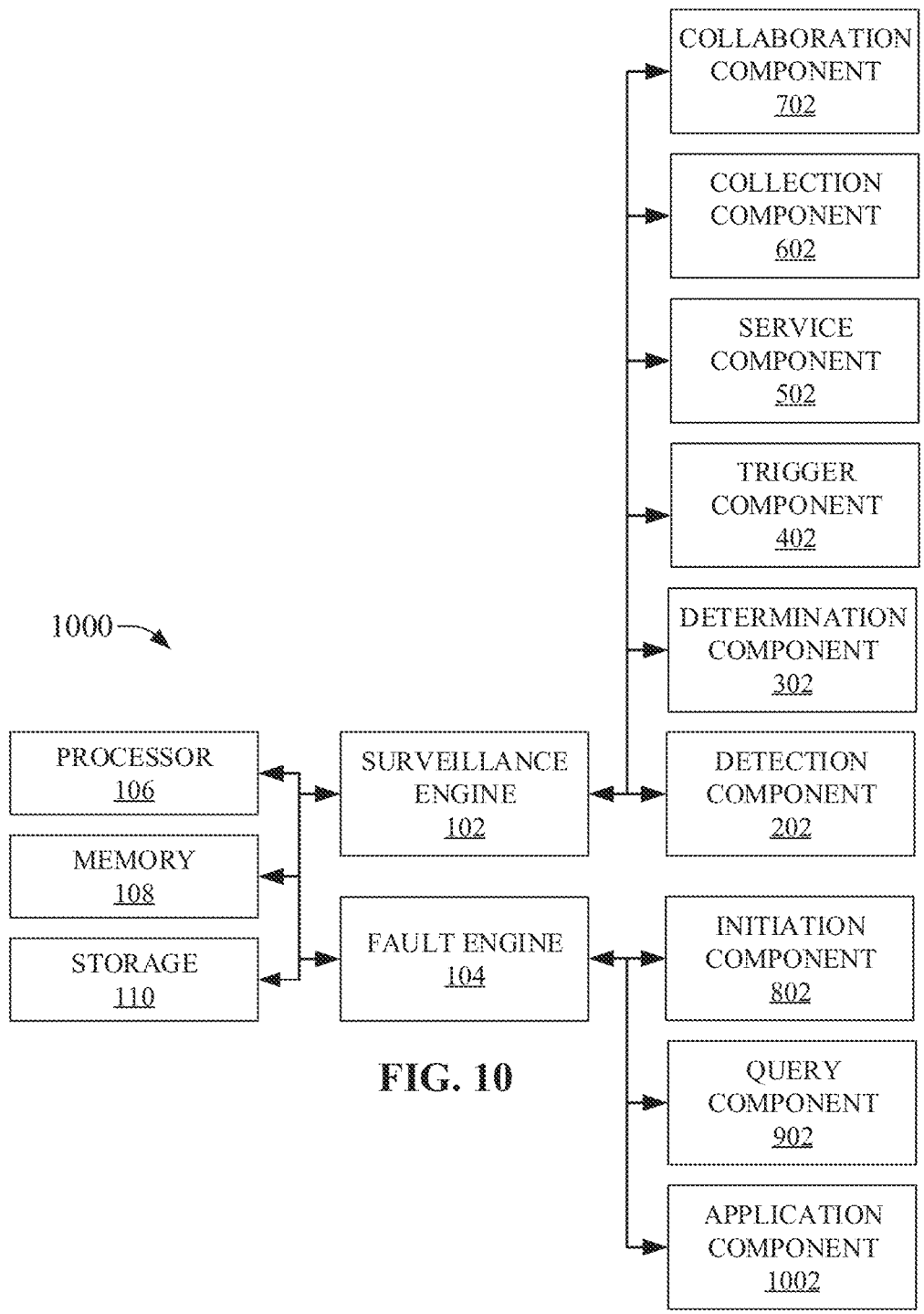
FIG. 10 illustrates yet another system for providing fault-tolerant signaling in a LTE network architecture, in accordance with aspects of the subject disclosure FIG. 11 provides illustration of a flow chart or method for providing fault-tolerant signaling in a LTE network architecture, in accordance with aspects of the subject disclosure.

FIG. 10 provides additional depiction of system 100, now represented as system 1000, that in accordance with various embodiments provides for fault-tolerant signaling in a LTE network architecture. System 1000 can comprise fault engine 104 that can be in operative communication with initiation component 802, query component 902 and application component 1002. In this instance, fault engine 104, initiation component 802, query component 902, and application component 1000 in collaboration with one another can apply respective attribute data representing QoS attributes, security attributes, Codex data, etc. for each of the first device and the second can be applied to the established secondary signaling path (e.g., non-IMS signaling path) and a communication session between the first device and the second device can take place.

Figure 11:
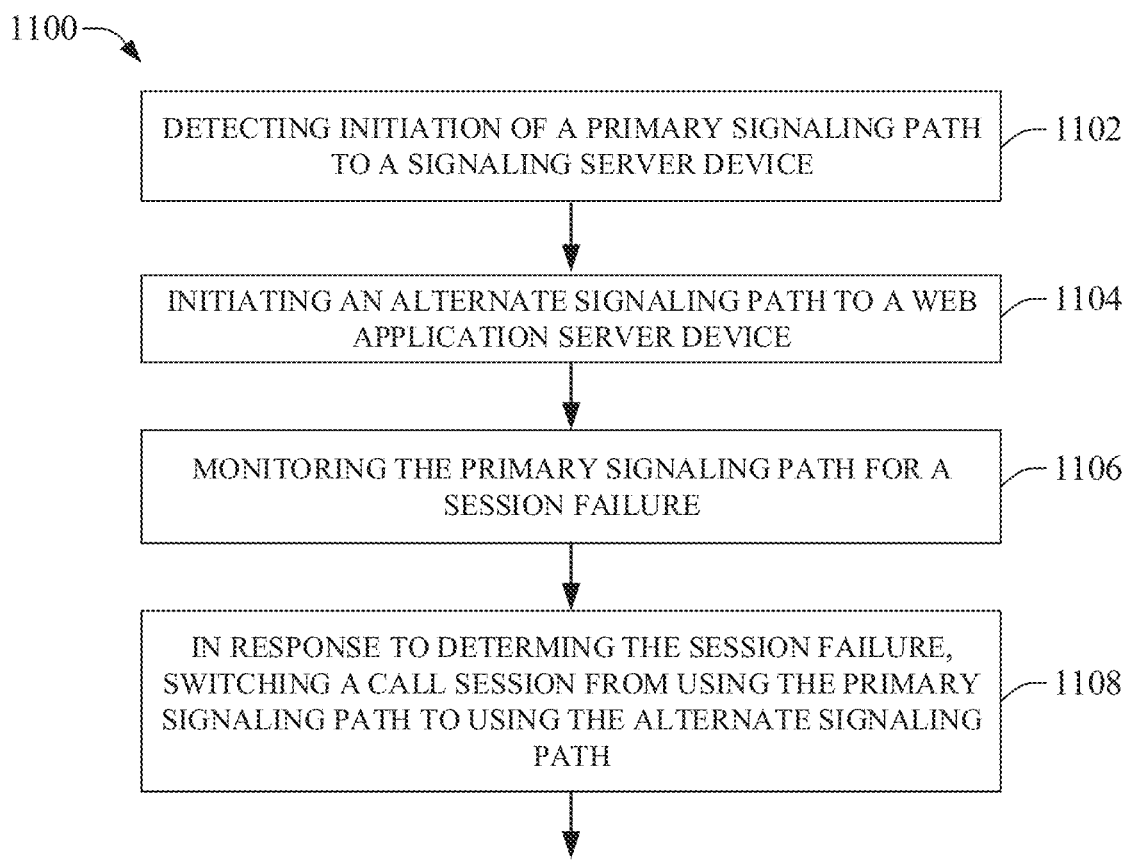

In view of the example system(s) described above, example method(s) that can be implemented in accordance with the disclosed subject matter can be better appreciated with reference to flowchart in FIG. 11. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 11 illustrates a method 1100 that provides for fault-tolerant signaling in a LTE network architecture. Method 1100 can commence at act 1102 where an initiation of a primary signaling path to a signaling service device can be detected. At 1104, as a function of the detection of the initiation of the primary signaling path to the signaling server device, an alternative signaling path to a web application server device can be initiated. At 1106 the primary signaling path can be monitored for a session failure representative of a call session. At 1108 in response to determining that a session failure has occurred, switching the call session from using the primary signaling path to using the alternate signaling path.

It should be realized and appreciated by those of ordinary skill, the foregoing non-limiting example use application(s) are merely illustrations of a use to which the disclosed and described solution can be applied and thus are provided solely for the purposes of exposition. The described and disclosed subject matter is therefore not limited to the foregoing example application(s), but can find applicability in other more generalized circumstances and use applications.

Figure 12:
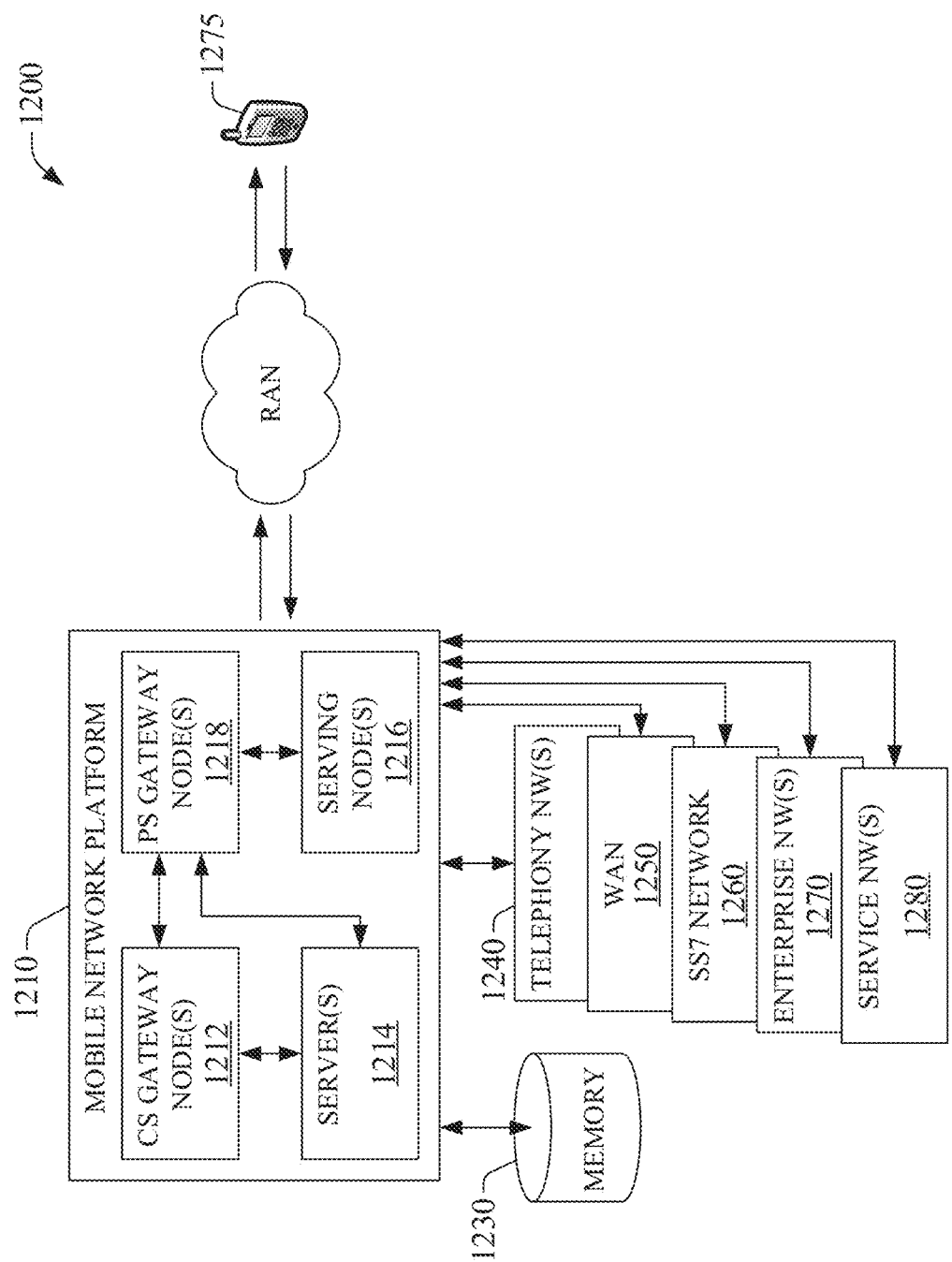
FIG. 12 is a block diagram of an example embodiment of a mobile network platform to implement and exploit various features or aspects of the subject disclosure.

FIG. 12 presents an example embodiment 1200 of a mobile network platform 1210 that can implement and exploit one or more aspects of the disclosed subject matter described herein. Generally, wireless network platform 1210 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1210 can be included in telecommunications carrier networks, and can be considered carrier-side components as discussed elsewhere herein. Mobile network platform 1210 includes CS gateway node(s) 1212 which can interface CS traffic received from legacy networks like telephony network(s) 1240 (e.g., public switched telephone network (PSTN), or public land mobile network (PLMN)) or a signaling system #7 (SS7) network 1270. Circuit switched gateway node(s) 1212 can authorize and authenticate traffic (e.g., voice) arising from such networks. Additionally, CS gateway node(s) 1212 can access mobility, or roaming, data generated through SS7 network 1260; for instance, mobility data stored in a visited location register (VLR), which can reside in memory 1230. Moreover, CS gateway node(s) 1212 interfaces CS-based traffic and signaling and PS gateway node(s) 1218. As an example, in a 3GPP UMTS network, CS gateway node(s) 1212 can be realized at least in part in gateway GPRS support node(s) (GGSN). It should be appreciated that functionality and specific operation of CS gateway node(s) 1212, PS gateway node(s) 1218, and serving node(s) 1216, is provided and dictated by radio technology(ies) utilized by mobile network platform 1210 for telecommunication.

In addition to receiving and processing CS-switched traffic and signaling, PS gateway node(s) 1218 can authorize and authenticate PS-based data sessions with served mobile devices. Data sessions can include traffic, or content(s), exchanged with networks external to the wireless network platform 1210, like wide area network(s) (WANs) 1250, enterprise network(s) 1270, and service network(s) 1280, which can be embodied in local area network(s) (LANs), can also be interfaced with mobile network platform 1210 through PS gateway node(s) 1218. It is to be noted that WANs 1250 and enterprise network(s) 1270 can embody, at least in part, a service network(s) like IP multimedia subsystem (IMS). Based on radio technology layer(s) available in technology resource(s) 1217, packet-switched gateway node(s) 1218 can generate packet data protocol contexts when a data session is established; other data structures that facilitate routing of packetized data also can be generated. To that end, in an aspect, PS gateway node(s) 1218 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1200, wireless network platform 1210 also includes serving node(s) 1216 that, based upon available radio technology layer(s) within technology resource(s) 1217, convey the various packetized flows of data streams received through PS gateway node(s) 1218. It is to be noted that for technology resource(s) 1217 that rely primarily on CS communication, server node(s) can deliver traffic without reliance on PS gateway node(s) 1218; for example, server node(s) can embody at least in part a mobile switching center. As an example, in a 3GPP UMTS network, serving node(s) 1216 can be embodied in serving GPRS support node(s) (SGSN).

For radio technologies that exploit packetized communication, server(s) 1214 in wireless network platform 1210 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1210. Data streams (e.g., content(s) that are part of a voice call or data session) can be conveyed to PS gateway node(s) 1218 for authorization/authentication and initiation of a data session, and to serving node(s) 1216 for communication thereafter. In addition to application server, server(s) 1214 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1210 to ensure network's operation and data integrity in addition to authorization and authentication procedures that CS gateway node(s) 1212 and PS gateway node(s) 1218 can enact. Moreover, provisioning server(s) can provision services from external network(s) like networks operated by a disparate service provider; for instance, WAN 1250 or Global Positioning System (GPS) network(s) (not shown). Provisioning server(s) can also provision coverage through networks associated to wireless network platform 1210 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1275.

It is to be noted that server(s) 1214 can include one or more processors configured to confer at least in part the functionality of macro network platform 1210. To that end, the one or more processor can execute code instructions stored in memory 1230, for example. It is should be appreciated that server(s) 1214 can include a content manager 1215, which operates in substantially the same manner as described hereinbefore.

In example embodiment 1200, memory 1230 can store information related to operation of wireless network platform 1210. Other operational information can include provisioning information of mobile devices served through wireless platform network 1210, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1230 can also store information from at least one of telephony network(s) 1240, WAN 1250, enterprise network(s) 1270, or SS7 network 1260. In an aspect, memory 1230 can be, for example, accessed as part of a data store component or as a remotely connected memory store.

Figure 13:
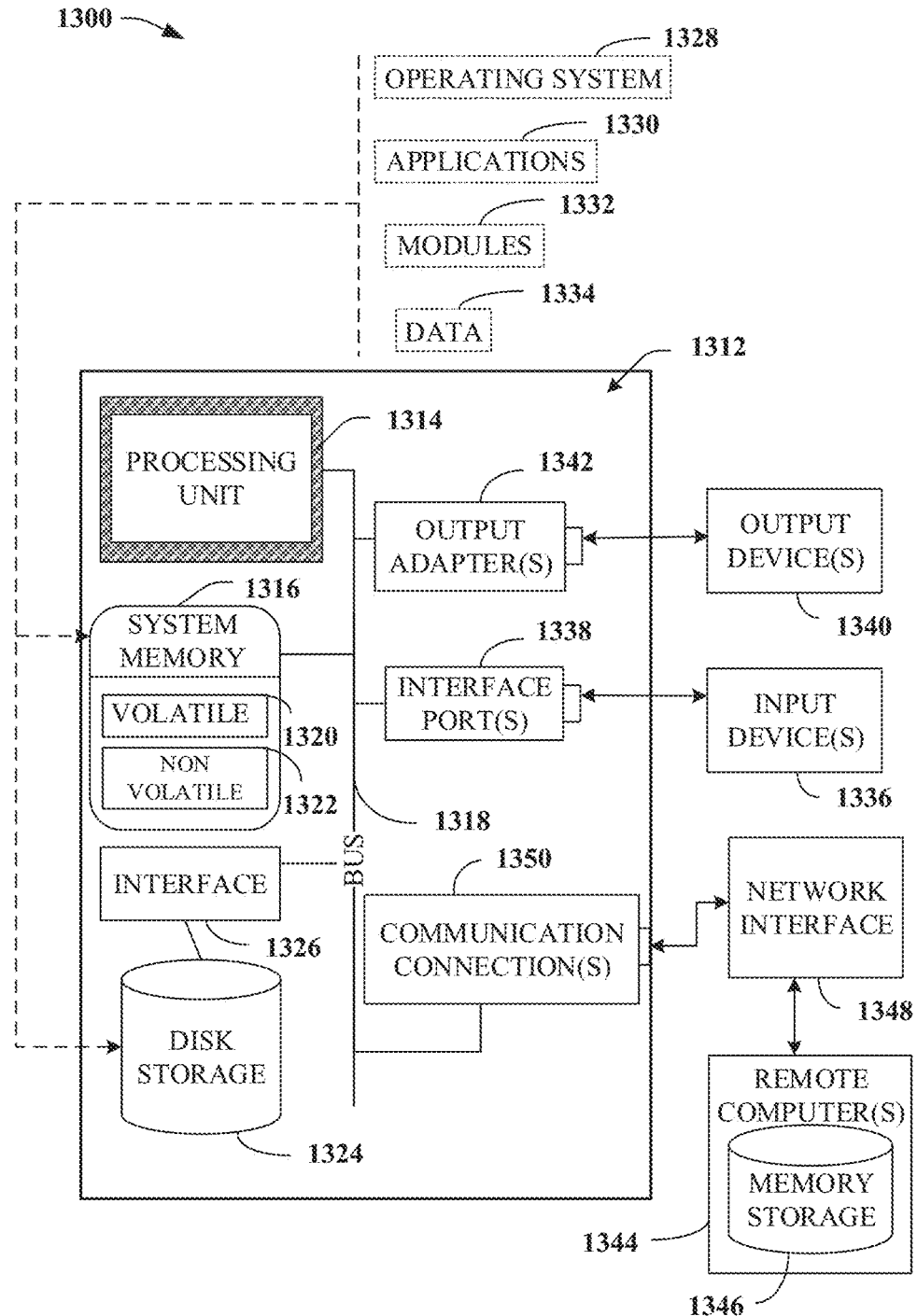
FIG. 13 illustrates a block diagram of a computing system operable to execute the disclosed systems and methods in accordance with an embodiment.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 13 illustrates a block diagram of a computing system 1300 operable to execute the disclosed systems and methods in accordance with an embodiment. Computer 1312, which can be, for example, part of the hardware of system 130, includes a processing unit 1314, a system memory 1316, and a system bus 1318. System bus 1318 couples system components including, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1316 can include volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 can also include removable/non-removable, volatile/non-volatile computer storage media. FIG. 13 illustrates, for example, disk storage 1324. Disk storage 1324 includes, but is not limited to, devices like a magnetic disk drive, floppy disk drive, tape drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 13 describes software that acts as an intermediary between users and computer resources described in suitable operating environment 1300. Such software includes an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be noted that the disclosed subject matter can be implemented with various operating systems or combinations of operating systems.

A user can enter commands or information into computer 1312 through input device(s) 1336. As an example, mobile device and/or portable device can include a user interface embodied in a touch sensitive display panel allowing a user to interact with computer 1312. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1314 through system bus 1318 by way of interface port(s) 1338. Interface port(s) 1338 include, for example, a serial port, a parallel port, a game port, a universal serial bus (USB), an infrared port, a Bluetooth port, an IP port, or a logical port associated with a wireless service, etc. Output device(s) 1340 use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340 like monitors, speakers, and printers, among other output devices 1340, which use special adapters. Output adapters 1342 include, by way of illustration and not limitation, video and sound cards that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, cloud storage, cloud service, a workstation, a microprocessor based appliance, a peer device, or other common network node and the like, and typically includes many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically connected by way of communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. Network equipment, comprising:
   a processor; and
   a memory that stores executable instructions that, when executed by the processor, facilitate performance of operations, comprising:
   switching a call session from using a first signaling path to using a second signaling path, wherein the first signaling path is enabled via a voice over long term evolution core network service;
   wherein the second signaling path is initiated in response to the first signaling path being initiated to signaling server equipment;
   wherein the second signaling path is established as a function of a web real-time communication protocol associated with execution of a wrapper application via web application server equipment, and wherein the web real-time communication protocol is not associated with the voice over long term evolution core network service;
   wherein the switching of the call session is performed based on an expiration of time as measured by a failure timer; and
   wherein the failure timer is started based on detecting a failure associated with the call session.

2. The network equipment of claim 1, wherein the operations further comprise monitoring the first signal path for the failure of the call session.

3. The network equipment of claim 1, wherein the network equipment is first equipment, and wherein the signaling server equipment is second equipment of a group of network equipment that operate using Internet protocol multimedia core network subsystem signaling.

4. The network equipment of claim 1, wherein the network equipment is a first equipment, and wherein the web application server equipment is second equipment of a group of network equipment that operate using alternate signaling other than Internet protocol multimedia core network subsystem signaling.

5. The network equipment of claim 1, wherein the operations further comprise collecting, from a user equipment initiating the call session, calling information data representative of the first signaling path.

6. The network equipment of claim 5, wherein the second signaling path being initiated comprises the second signaling path being established using the calling information data.

7. The network equipment of claim 1, wherein the operations further comprise, based on the second signaling path having been initiated, initiating a call establishment service request to the web application server equipment.

8. The network equipment of claim 7, wherein the operations further comprise, in response to the call session being determined to have been established via the first signaling path, canceling the call establishment service request.

9. A method, comprising:
monitoring, by equipment comprising a processor, a first signaling path to signaling server equipment for a failure of a call session, wherein the first signaling path is established as part of a voice over long term evolution core network service;
detecting, by the equipment, the failure of the call session;
initiating, by the equipment, a failure timer that is used to determine, as a function of an elapse of time as measured by the failure timer, that the call session has failed;
in response to the call session being determined to have failed, facilitating, by the equipment, switching the call session from using the first signaling path to using a second signaling path; and
establishing, by the equipment, the second signaling path as part of an instantiation of a wrapper application associated with a web real-time communication protocol that is not a voice over long term evolution protocol used with the voice over long term evolution core network service.

10. The method of claim 9, further comprising facilitating, by the equipment, establishing the second signaling path to web application server equipment.

11. The method of claim 9, wherein the second signaling path is designated as an alternative signaling path to the first signaling path.

12. The method of claim 9, further comprising, in response to initiating the first signaling path, collecting, by the equipment, calling information data representative of the first signaling path, wherein the calling information data is received from a user equipment.

13. The method of claim 12, wherein the second signaling path is established using the calling information data.

14. The method of claim 9, further comprising initiating, by the equipment, a countdown timer in response to the second signaling path being established.

15. The method of claim 9, further comprising, in response to the second signaling path being established, initiating, by the equipment, a call establishment service request to web application server equipment.

16. The method of claim 15, further comprising, in response to detecting that the call session was successfully established, facilitating, by the equipment, canceling the call establishment service request.

17. A non-transitory machine-readable medium, comprising executable instructions that, when executed by a processor, facilitate performance of operations, comprising:
monitoring a first signaling path to signaling server equipment for a failure of a call session, wherein the first signaling path is established according to a voice over long term evolution core network service;
detecting the failure of the call session;
initiating a failure timer that is used to determine that the call session has failed after expiration of a defined time period; and
in response to the failure of the call session, switching, by the equipment, the call session from using the first signaling path to using a second signaling path, wherein the using the second signaling path comprises establishing the second signaling path based on a wrapper application initiated according to a web real-time communication protocol, and wherein the web real-time communication protocol is not applicable to usage of the voice over long term evolution core network service.

18. The non-transitory machine-readable medium of claim 17, wherein using the second signaling path comprises establishing the second signaling path to web application server equipment.

19. The non-transitory machine-readable medium of claim 17, wherein the operations further comprise initiating a countdown timer in response to the second signaling path being established.

20. The non-transitory machine-readable medium of claim 17, wherein the second signaling path is designated as an alternative signaling path to the first signaling path.

* * * * *